United States Patent [19]
Englund et al.

[11] 3,761,694
[45] Sept. 25, 1973

[54] CASH REGISTER MECHANISM

[75] Inventors: Gosta Roland Englund, Stockholm; Claes-Goran Lindelow, Taby; Bengt Ragnar La Motte, Solna, all of Sweden

[73] Assignee: Svenska Dataregister AB, Solna, Sweden

[22] Filed: May 3, 1971

[21] Appl. No.: 139,614

[30] Foreign Application Priority Data
May 4, 1970  Sweden.............................. 6061/70

[52] U.S. Cl. ........................ 235/153 R, 235/61 PB
[51] Int. Cl. ............................................ G06f 11/00
[58] Field of Search ............ 340/146.1 R, 146.1 AJ, 340/146.1 AB, 345; 235/153, 61 PB, 61 PE

[56] References Cited
UNITED STATES PATENTS
3,105,636  10/1963  Greene ............................ 340/146.1
3,265,874  8/1969  Soule, Jr. ......................... 340/146.1
3,526,875  9/1970  Jourdan ......................... 340/146.1
3,576,433  4/1971  Lee et al. ......................... 340/146.1

Primary Examiner—Charles E. Atkinson
Attorney—Norman Friedman, Stephen E. Feldman, Arthur T. Groeninger and Morris I. Pollack

[57] ABSTRACT

A register mechanism operates in conjunction with an information storage unit to (a) allow a transfer to the storage unit of information entered on the keyboards of the register (b) indicate on an audit tape the entered information and that the data has been correctly transferred to the storage unit and (c) indicate on an audit tape the entered data only.

1 Claim, 6 Drawing Figures

PATENTED SEP 25 1973 3,761,694

CASH REGISTER MECHANISM

The present invention relates to business machines such as cash registers, accounting machines and the like which are connected to a central unit via a terminal system. For instance, said central unit can be a data computer or just an information storing unit. In particular, this invention relates to a method and to a system, respectively, for indicating if information transferred in electrical form from a business machine of the above-mentioned kind to an information supporting unit positioned at a distance from said business machine has been correctly received or not.

In such an arrangement wherein a number of cash registers, via a terminal system, are connected to a central unit containing an information storing unit, it is desirable to provide an audit strip arranged in the cash register not only with information concerning amount, department, custom No. and the like but also, to indicate if this information has been correctly transferred or not. Thereafter, for instance at the end of the day, the audit strip can be checked, whereby information not correctly transferred can be eliminated so that the correct information thereafter can be conveyed into the central information storing unit. It is of course also possible to provide the audit strip with particular control marks to indicate incorrectly transferred information. However, it has appeared to be more suitable to provide the audit strip with particular control marks in connection with correctly transferred information. According to this, the absence of a mark will serve to indicate the presence of an error in the output means of a cash register, or on the transferring connection, or in the input means of the central unit. The present invention is directed to apparatus and means for providing and detecting the above-mentioned error indications.

In the following the invention will be described in more detail in a particular embodiment taken in connection to the appended drawings on which;

Figure 1:
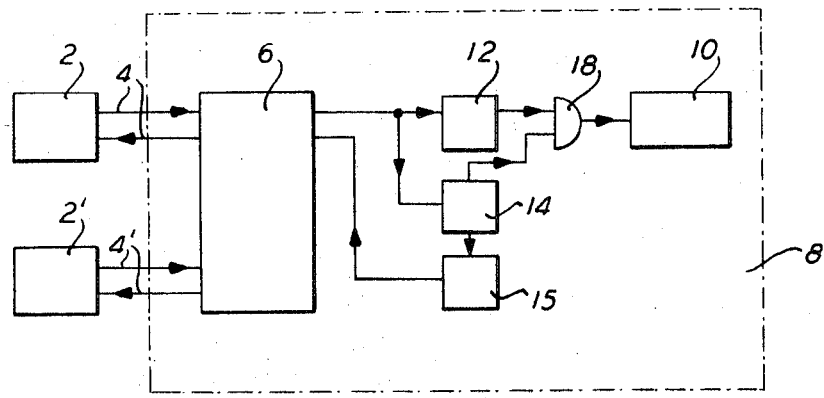
FIG. 1 is a schematic diagram of an arrangement wherein information is transferred between cash registers and a central unit.

FIG. 1 schematically illustrates in block form an arrangement wherein two cash registers 2, 2' via connections 4, 4' are connected to selecting means 6 in a central unit 8. Each of said connections 4, 4' consists of one connection through which information is transferred from one cash register 2 or 2' to central unit 8 and one connection through which control signals are transferred from central unit 8 to connected cash register 2 or 2'. Furthermore, central unit 8 includes a buffer memory 12, in which information from a cash register is stored during a period when the correctness of the information is controlled by a control device 14 which affects a control signal transmitter 16. When the information has been found correct, the transmitter 16 emits a control signal, herein called "release signal," to the connected cash register whereby the blocking of said register against a new start is abolished. Said blocking is present during a register operation including information transferring to the central unit 8. The checking of the information will not be described herein as this checking can be performed in a plurality of ways, depending on the kind of information and on the chosen code for this information. For instance, the "release signal" can affect a solenoid, which in turn affects a blocking means in order to abolish the blocking. When the blocking is abolished and thus, the cash register is free for new operations, the electrical information flow to the central unit is also cut off, since a device for transforming of the information in the cash register into electrical form is also cut off or disabled. The transforming device, not further described herein may be of the kind described in the Swedish patent application as published for opposition No. 319.637. When the flow of information is cut off control device 14 emits a signal to an AND-gate 18, which operates to pass the information stored in buffer memory 12 through to a storage means 10, where it is stored on magnetic tapes.

Figure 2:
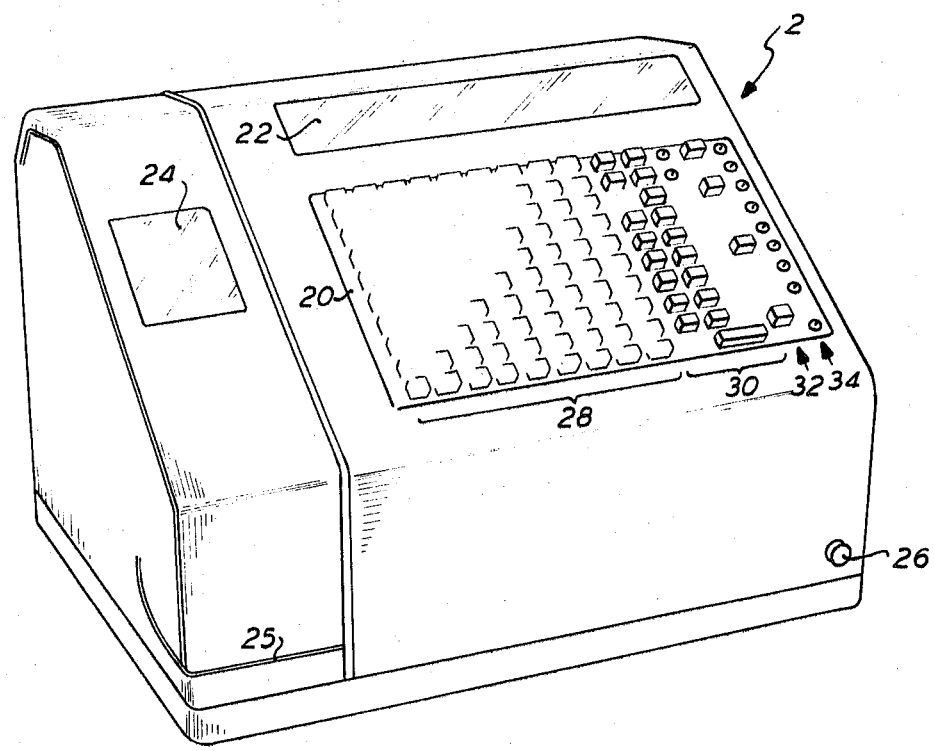
FIG. 2 is an enlargement of one of the cash registers shown in FIG. 1.

In FIG. 2 there is shown one of the schematically represented cash registers 2, 2' in FIG. 1. The cash register is of a conventional kind and is provided with a keyboard 20, counters (not shown in the figure), an indicator 22 and a printing arrangement positioned in the left part of the register and containing an audit strip, which can be read through a window 24. Below window 24 is arranged an opening 25 for the audit strip and to the right at the very bottom of the front side of the register is arranged a button 26 through which the blocking function of a new start of the register can be manually abolished. For instance, this button can mechanically affect the solenoid mentioned in the previous paragraph. The keyboard is of conventional kind and comprises a set of amount keys in an amount bank 28, a set of selector keys in a selector bank 30 and a set of mode of operation keys in a mode of operation bank 32 and a set of locks in a locking bank 34, said locks being designed for reading— an zeroizing operations.

Figure 3:
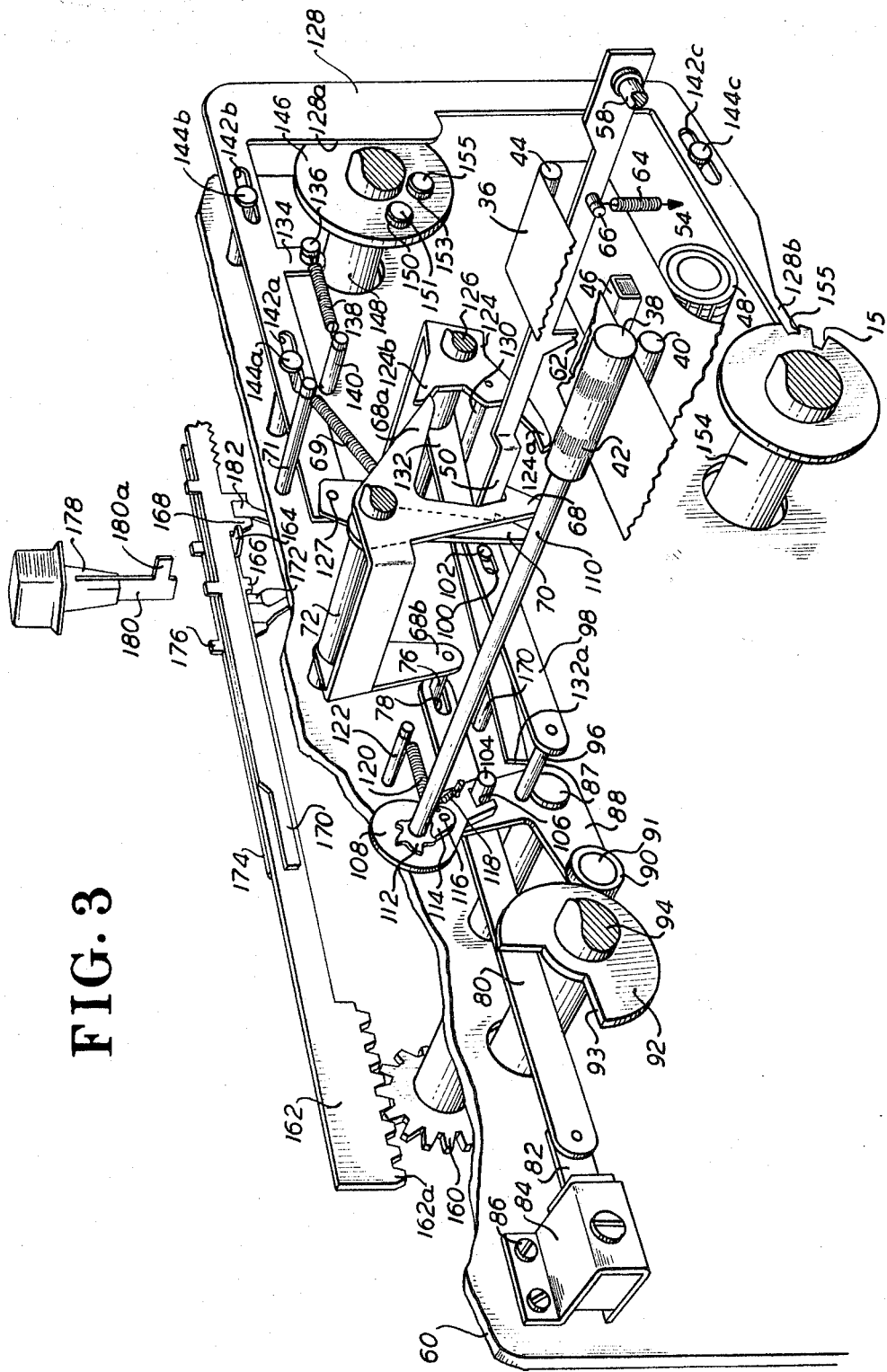
FIG. 3 is a perspective view of a printing device according to the invention with certain parts taking up a second position.
Figure 4:
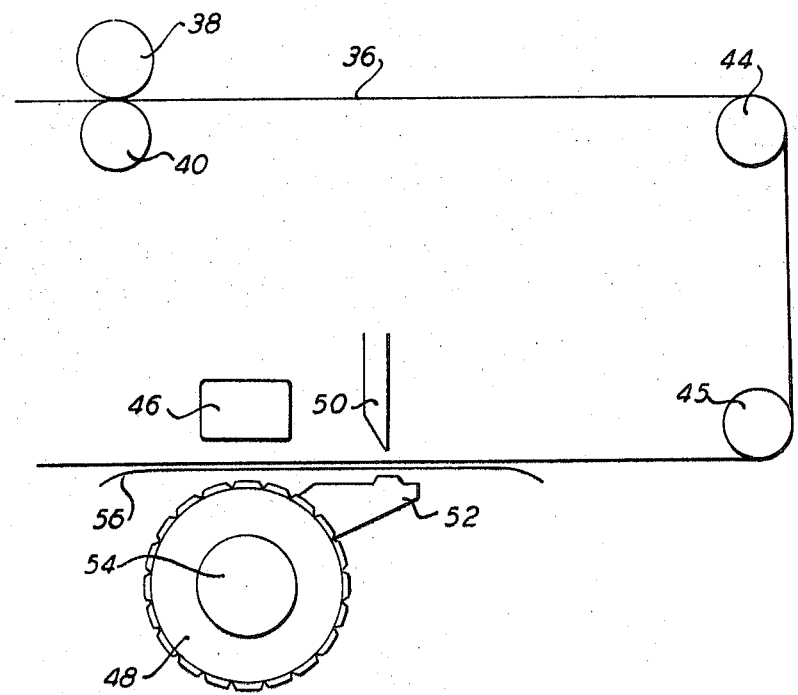
FIG. 4 is a detail view of the printing station.

Referring to FIGS. 3–6 the different parts of a cash register included in the printing operation of the checking mark on the audit strip mentioned in the introductory portion this specification will now be described. The audit strip 36 is arranged to be driven by a couple of rollers, one drive roller 38 and one guide roller 40, and these two rollers countinously squeeze the audit strip 36 between themselves. Rollers 38, 40 are partly grooved such as at 42, for safer driving of the audit strip. The audit strip is driven over guiding rollers 44, 45 through a printing station, i.e., between a print hammer 46 and type wheels 48 and between the print hammer 50 and a flat holding-on tool 52 (FIG. 4). Type wheels 48 are supported on a shaft 54 on which holding-up tool 52 is also fixed. Between audit strip 36 and holding-up tools 48, 52 which cooperate with print hammbers 46, and 50 is arranged an inked ribbon 56 is arranged, which however, for the sake of clearness has been eliminated from FIG. 3. Print hammer 46 and type wheels 48 are designed for printing of amounts, departments, mode of operations, etc. on audit strip 36 and do not particularly concern this invention. These mentioned parts will therefore not be further described. A more complete description of the this portion of the register and of the manner of operation for an audit strip printing arrangement of the kind partly shown in FIG. 3 can be found in U.S. Pat. No. 3,296,961.

Print hammer 50 consists of an extended arm, whose one end is pivotally supported on a shaft 58, which is firmly mounted in the register stand. One side wall of this stand is shown and indicated with 60. The hammer is provided with a downwardly directed part, which is bevelled downwards and whose downturned end surface 62 constitutes a line shaped printing surface, which cooperates with the flat holding-up tool 52. Alternatively, printing surface 62 can of course be relatively larger than illustrated in the figures and cooperate with a print type which corresponds to any desired control mark and which is arranged on the flat holding-up tool. A spring 64 is attached to a tap 66 on hammer 50 so as to urge it downwardly as illustrated. The free end of hammer 50 is normally hooked up by two hooks 68 and 70 supported on a shaft 72. Hook 68 is spring biased in a counter clockwise about the shaft 72 by a spring 69 whose ends are attached to the hook and to a tap 71 fixedly arranged in the stand wall 60, respectively. Hook 70 is in a corresponding way spring urged in a counter clockwise direction about the shaft 72 by a spring 73 whose ends are fixed to the hook and to a tap 75 attached to the stand wall 60, respectively. Hook 68 is arranged to release hammer 50 in response to a control signal from central unit 8 and hook 70 is arranged to provide a delay in the definite releasing operation until the audit strip is fed a predetermined distance. As is apparent from FIG. 4 the two print hammers 46 and 50 are spaced from each other a certain distance which means that the audit strip must be moved a certain distance when amounts and similar information is printed by hammer 46 so that the print from the hammer 50 will be positioned on the same line as the amount print.

Hook 68 is provided with a part 68b having a tap 76. Tap 76 meshes with a groove 78 in a slide 80 which is riveted to the movable core 82 in a solenoid 84. Solenoid 84 is screwed in the wall 60 by screws 86. Solenoid 84 is arranged to be actuated by the earlier mentioned "release signal" from central unit 8 and thereby pull core 82 towards itself, whereby slide 80 moves to the left in FIG. 3 bringing with it the tap 76 on part 68b. Hook 68 is thereby turned clockwise and releases hammer 50.

The mechanism for releasing hook 70 consists of an angular arm 88, rotatably supported on a shaft 87, and on whose one end part is arranged a roller 90 on a tap 91, said roller cooperating with a cam disc 92 firmly arranged on a shaft 94. The shaft 94 which receives its movement from the main shaft of the cash register and is turned one rotation during each machine operation. Arm 88 is spring urged clockwise by a spring 120 fixed to a tap 122 in the register wall 60. A continued contact between the roller 90 and the periphery of cam disc 92 is thereby assured. On arm 88 is arranged a tap 96 on which is attached one part of a slide 98 whose other endpart is provided with a groove 100 in which a tap 102, arranged on hook 70, will mesh.

Cam disc 92, roller 90 and an arm 88 are also used for the driving of the feeding means 38, 40 for the audit strip. A tap 104 is arranged on arm 88 and meshes in a recess 106 in a disc 108 rotatably supported on a shaft 110 on which feeding roller 38 is firmly arranged and whose both parts are rotatably supported in the register stand. On shaft 110, near disc 108 is firmly arranged a blocking wheel 112 which cooperates with a blocking hook 114 rotatably supported on a tap 116 on disc 108 and spring urged against the blocking wheel by a spring 118.

An arm 124 is arranged to hook up hammer 50 and is supported on a shaft 126. The arm 124 is also movably riveted by a rivet joint 127 to a test arm 128 so as to be movable to three different positions upon suitable displacement of the test arm 128. Arm 124 is provided with a part 124a cooperating with hammer 50 and arranged to hook up this hammer 50 but also functioning to block the downward movement of the hammer in one of the mentioned three positions so as to inhibit printing by the hammer 50. Furthermore, arm 124 is provided with a part 124b which in another of the mentioned positions cooperates with a part 68a on hook 68 for mechanically releasing the hammer 50 so as to allow printing. Finally, arm 124 is provided with a tap 130, which, when arm 124 takes up that position wherein part 124a prevents the release of print hammer 50, the tap 150 displaces an arm 132 supported on shaft 126 to take up a position wherein the end part 132a of arm 132 is positioned in front of tap 104 on arm 88 (this is seen in the clockwise movement of the arm) and thus prevent the movement of arm 88 and thereby the feeding of the audit strip.

Test arm 128 is provided with a projection 134 on which a tap 136 is arranged so as to constitute one point of attachment for a spring 138, whose other point of attachment is a tap 140 arranged on the stand wall 60. The test arm 128 is thereby always spring urged to the left in FIGS. 3, 5 and 6. Three recesses 142a, b and c in test arm 128 cooperate with three corresponding guiders 144a, b and c attached to the stand wall 60 for guiding the movement of the arm. A control curve in the form of a disc 146 supported on the shaft 148 and provided with a roller 150 carried by a tap 151 cooperates with the edge 128a on test arm 128 and is designed to urge the test arm in a direction opposite the pull of the spring 138 i.e., to the right in FIGS. 3, 5 and 6, during one part of the machine operation, and thereafter release the test arm for movement to the left. The part 128b of the arm 128 bears against a test disc 152 fixed on shaft 154 after the arm has been returned to the left. The test disc 152 is in the embodiment provided with two radially extending recesses 156, 158 of different depth and the test arm can thereby take up three different positions with the part 128b bearing in one of the recesses or against the external edge of the disc.

Shaft 154 is provided with a gear 160 on the side of stand wall 60 which is remote from test disc 152. Gear 160 meshes with a cogged part 162a on a rack 162. Rack 162 is provided with rebent parts 164, 166 which cooperate with projections 168 on a mode of operation rack 170 and with projections 172 on a complementary rack 174, respectively. Furthermore, the mode of operation — and complementary racks are provided with projections 176 designed for cooperation with keys in the mode of operation bank 32 on the key board, see also FIG. 2. A key 178 is shown in FIG. 3 with key stems 180 and a projection 180a arranged on the same end cooperating with projections 176 on the mode of operation — and the complementary rack, respectively. The mode of operation rack 170 is compulsary driven together with complementary rack 174 by driving means 182, see FIG. 3. A more detailed description of the driving of the above type of racks in cooperation with keys may be found in U.S. Pat. No. 3.263.915.

The above described test device consisting of test arm 128 and test disc 152 as the most important components, is used in the described embodiment to set arm 124 in three different positions corresponding to three different kind of operations. The first kind of operation relates to posts or data not to be transferred to central unit 8 and not to be printed on the audit strip. The second kind of operation relates to posts which are to be transferred to central unit 8 and which are to be printed on the audit strip. The third kind of operation relates to posts not to be transferred to central unit 8 but which are to be printed on the audit strip.

Figure 5:
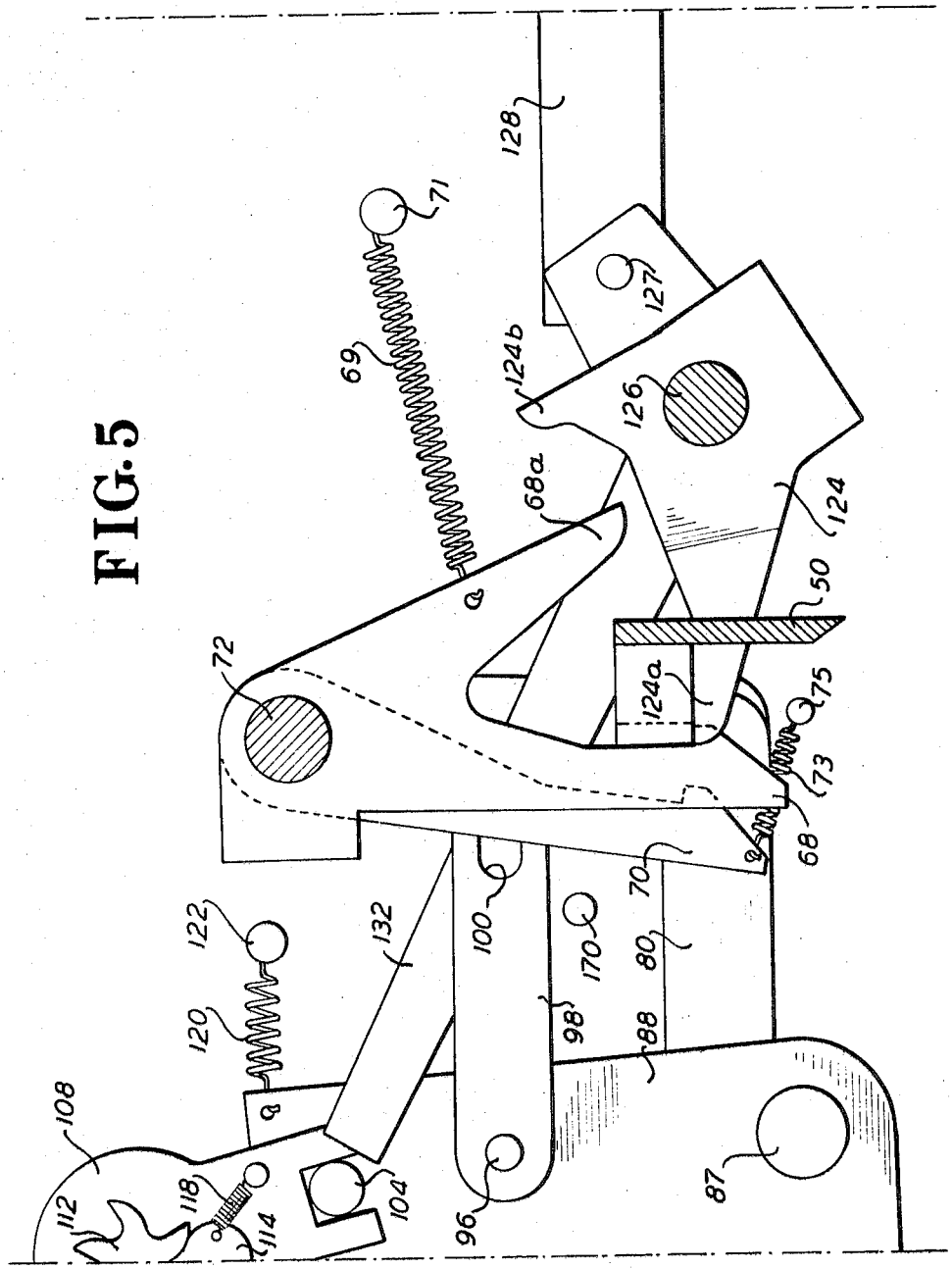
FIG. 5 is a side view of one part of the device shown in FIG. 3 wherein the parts mentioned in connection to FIG. 3 take up a first position.

In FIG. 5 there is illustrated the first kind of operation, i.e., the operation for posts not to be transferred and not to be printed on the audit strip. The first thing that happens is that test arm 128 is driven to the right by roller 150 on disc 176. Thereafter, racks 162, 166 are driven to a position for setting of test disc 152, wherein the external edge of disc 152 is positioned right in front of testing part 128b of test arm 128. Thereafter, test arm 128 is released by roller 150 and pulled to the left by spring 138 until its part 128b bears against the external edge of test disc 152. During the movement to the right of test arm 128, arm 124 was rotated clockwise, whereby part 124a meshed with hammer 50 and raised said hammer 50 to a stretched-up position wherein said hammer 50 is hooked up by hook 68. Thereafter, when test arm 128 moves to the left, arm 124 is rotated counter-clockwise to a first position wherein part 124a on arm 124 still is positioned below hammer 50 and thereby prevents the hammer 50 from being moved downwards to the printing position evem if hook 68 should release the hammer for such a movement. In this position also tap 130 on arm 124 affects arm 132 in such a way that said arm will be raised and whereby the end part 132a thereof will be positioned in front of tape 104 and thereby block the receiving movement for feeding of the feeding mechanism, which movement will be described further in connection with the description of the second kind of operation, see FIG. 3. The mentioned receiving movement performed by parts 88 and 108 also releases print hammer 46 which provides the audit strip with prints concerning amount, department, mode of operation, etc. However, this aspect of the register mechanism does not concern the invention and will therefore not be further described. When the receiving movement is blocked, the amount print is also blocked and the feeding of the audit strip will be inhibited.

FIG. 3 illustrates the second kind of operation including information posts which are to be transferred to central unit 8. As mentioned above central unit 8 returns a "release signal" to the cash register after the operating cycle of the register is complete and the information has been printed. This "release signal" indicates that the information has been correctly received. This shall also be indicated on the audit strip by the above-mentioned control mark.

During the second kind of operation, test arm 128 is driven in the same way as during the first kind of operation, i.e., to the right by roller 150 on disc 146, whereafter rack 162 via gear 160 sets test disc 152 in a position where recess 156 is positioned right in front of part 128b on test arm 128. Thereafter, roller 150 releases test arm 128 for movement to the left, whereby the testing part 128b falls into recess 156. Thereby, arm 124 takes up the second position, i.e., the position shown in FIG. 3. When test arm 128 was moved to the right, hammer 50, as described above, was raised and hooked up in a raised-up position by hook 68. When test arm 128 thereafter moves to the left and arm 124 is rotated counter clock wise around shaft 126, part 124a is rotated out of the path of movement of hammer 150 so that hammer 50, when releases by hook 68 and 70 can be moved downwards.

When arm 124 is moved counter clockwise, tap 130 releases arm 132 which falls downwards against a stopping means 170. The blocking of the receiving movement for the feeding of the audit strip is thereby abolished and feeding of the audit strip can be performed. This feeding is performed in a following way: curve disc 92 rotated one revolution during the operation cycle of the register permits, during one part of the revolution, roller 90 on arm 88 to take up a position in recess 93. Thereby, arm 88 is rotated clockwise by spring 120 and causes part 108 supported on shaft 110 to move to the right which in turn causes the blocking hook 114 to move one step to the right on the blocking wheel 112. Thereafter, when curve disc 92 once again forces roller 90 up on the external periphery and arm 88 thereby is rotated counter clockwise, blocking hook 114 engages blocking wheel 112 in such a way that this and thereby also feeding roller 38 is rotated one feeding step. As described above feeding is not performed until amount, department and similar information have been printed by hammer 46.

When the operation cycle of the register is finished and the transferring of information to central unit 8 has been performed, only the releasing of the print hammer 50 remains. This releasing is performed when the cash register receives the "release signal" from central unit 8 The release signal is coupled to the solenoid 84 which in response to said release signal operates to pull the movable core 82 towards itself, whereby arm 80 is moved to the left, thereby causing hook 68 to be rotated clockwise via recess 78 and tap 76 so that hammer 50 will be released. The control mark, in this embodiment in the form of a minus sign, but which of course could be of any desired form at all, is thereby printed on the same line of the audit strip as the corresponding previously printed information concerning amount, department, etc.

The third kind of operation relates to posts which depending on the chosen system of cash registers are not to be transferred to the central unit but are to be printed on the audit strip.

Figure 6:
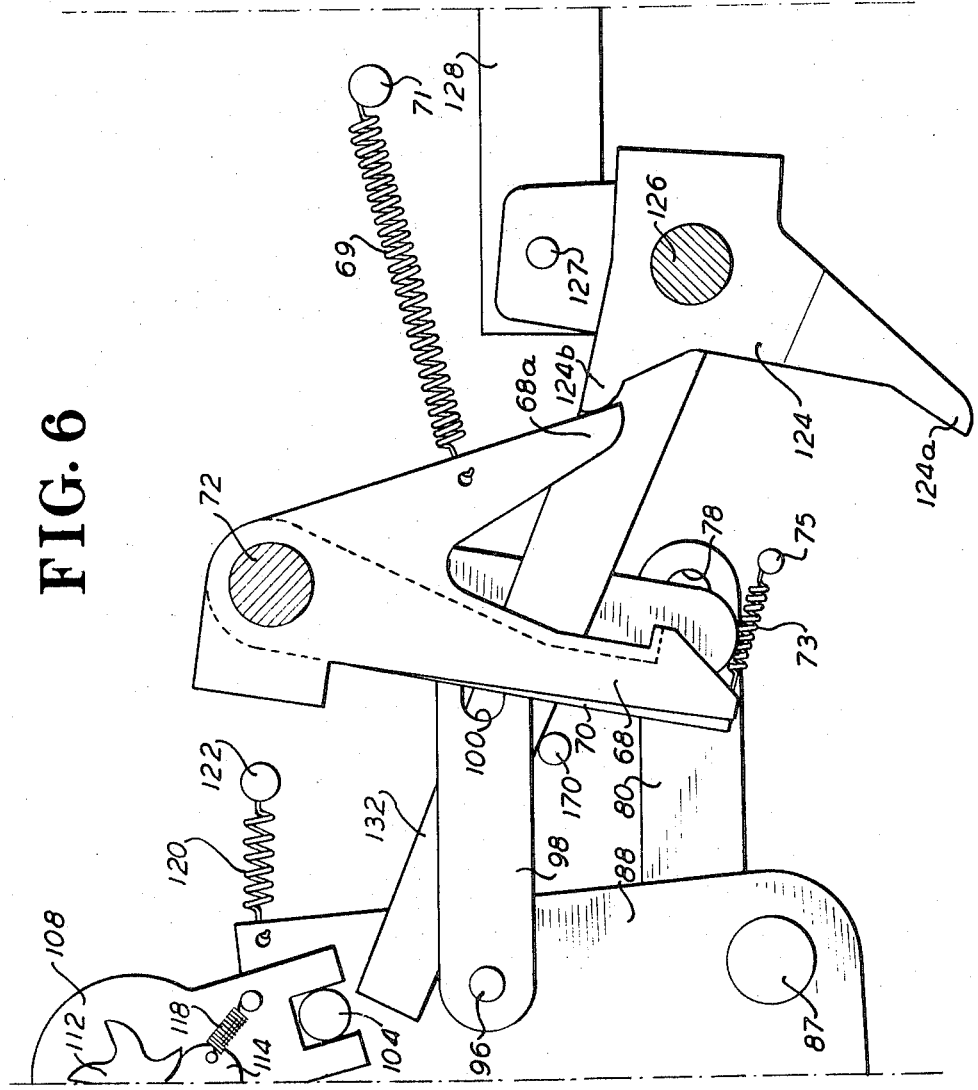
FIG. 6 is a side view corresponding to FIG. 5 but with the mentioned parts taking up a third position.

When test arm 128 is moved to the right during this third kind of operation, as shown in FIG. 6, test disc 152 is set, by rack 162 via gear 160 and shaft 154, to a position wherein recess 158 is positioned right in front of part 128b on testarm 128. Thereafter, when test arm 128 is moved to the left, part 128b will fall into recess 158 and thereby set arm 124 in the previously mentioned second position as shown in FIG. 3. This is accomplished by the use of an additional roller 153 which is arranged on disc 146, and supported on a tap 155. The roller 153 is positioned at a distance from shaft 148 which corresponds to the depths of recess 156, before the receiving movement of the audit strip has begun and thus, before arm 88 has been rotated clockwise and before hook 70 has been moved to the right to the position wherein it blocks hammer 50, the roller 153 bears against part 128a on test arm 128 and thus prevents the part 128b from completely falling into recess 158. When hook 70 has taken up its blocking position below hammer 50, roller 153 on disc 146 releases test arm 128 which therefore moves to the left to the third position determined by recess 158 in test disc 152. In this position arm 124 has been rotated counter clockwise so fas that part 124b affects part 68a on hook 68 and presses the hook clockwise with the result that hook 68 releases hammer 50 for downwards movement. Thus, during the third kind of operation a completely mechanical releasing of hammer 50 is received without the aid of a release signal from the central unit 8 to effect energization of the solenoid 84.

What is claimed is:

1. A register mechanism having means for keyboard entry of data and providing different modes of operation for printing of the data on an audit strip and for the transfer of said data to a remote storage unit, comprising:

means including an audit strip for printing thereon data entered via the keyboard operation of the register and a control sign printed thereon in response to the transfer of said data to a storage unit;

a test arm having two end portions and movable between three separate positions respectively corresponding to a register mode of operation to effect transfer of key-board entered data to (1) a storage unit, (2) a print-out on an audit strip and to a storage unit, and (3) to a print-out to an audit strip only;

a first blocking pawl;

a print hammer normally operative to effect printing of said control sign on said audit strip;

a solenoid having a movable core member coupled to said first blocking pawl, and operative in response to a control signal from said storage unit;

means coupling said print hammer to said first blocking pawl such that said hammer is inhibited against movement to a position for printing on said audit strip, said blocking of said print hammer movement being released in response to the operation of said solenoid;

feeding means coupled to said audit strip means for advancing said audit strip a predetermined distance after the printing of said keyboard entered data on said audit strip;

a second blocking pawl;

means coupling said second blocking pawl to said feeding means and said print hammer for blocking said hammer against movement to its printing position during the advancement of said audit strip after the printing of said keyboard entered data, the blocking of said print hammer being released after the advancement of said audit strip;

test disc means coupled to said test arm and responsive to a selected mode of operation of the register to cause said test arm to move to one of its separate positions, said test disc means being provided with two slots of different depths and extending from the periphery of the disc radially inward toward the disc center;

means coupling said test disc to said test arm such that one end portion of said test arm is engageable with the periphery of said test disc in the first test arm position, and receivable in one and the other of said two slots with the test arm in said second and third positions respectively, the other end portion of said test arm being coupled to said first blocking pawl to cause a release of the blocking of said print hammer absent the operation of said solenoid with said test arm in said third position and after movement of said audit strip said predetermined distance;

said test arm in said first position blocking the movement of said print hammer to its printing position and said test arm in said second position allowing the movement of said print hammer toward its printing position.

* * * * *